(12) United States Patent (10) Patent No.: US 12,682,014 B2
Shi (45) Date of Patent: Jul. 14, 2026

(54) CLUSTERING METHOD AND SYSTEM FOR ROAD OBJECT ELEMENTS OF CROWDSOURCED MAP, AND STORAGE MEDIUM

(71) Applicant: Chongqing Changan Automobile Co Ltd, Chongqing (CN)

(72) Inventor: Zuoqin Shi, Chongqing (CN)

(73) Assignee: Chongqing Changan Automobile Co Ltd, Chongqing (CN)

( * ) Notice: Subject to any disclaimer, the term of this patent is extended or adjusted under 35 U.S.C. 154(b) by 289 days.

(21) Appl. No.: 18/427,843

(22) Filed: Jan. 31, 2024

(65) Prior Publication Data

US 2024/0289424 A1 Aug. 29, 2024

(30) Foreign Application Priority Data

Feb. 28, 2023 (CN) .......................... 202310179510.9

(51) Int. Cl.
G06F 16/906 (2019.01)
G06F 18/23211 (2023.01)
G06V 10/762 (2022.01)
(52) U.S. Cl.
CPC ...... G06F 18/23211 (2023.01); G06F 16/906 (2019.01); G06V 10/762 (2022.01)

(58) Field of Classification Search
CPC .. G06F 18/23211; G06F 16/906; G06F 18/23; G06F 16/29; G06F 16/215; G06V 10/762
See application file for complete search history.

(56) References Cited

PUBLICATIONS

Tchuente, Dieudonné, et al. "Providing more regular road signs infrastructure updates for connected driving: A crowdsourced approach with clustering and confidence level." Decision Support Systems 141 (2021): 113443. (Year: 2021).*

* cited by examiner

*Primary Examiner* — Amandeep Saini
*Assistant Examiner* — Denise G Alfonso
(74) *Attorney, Agent, or Firm* — JMB Davis Ben-David

(57) ABSTRACT

Disclosed are a clustering method and system for road object elements of a crowdsourced map, and a storage medium. Data of road objects are skillfully represented by centroids thereof according to an improved mean shift algorithm, and geometric relationships between different objects are selected according to different types of road objects as measurement conditions for clustering. Neighborhood relationships of the objects are considered in the clustering process according to the characteristics of road element data types, and clustering output of different road element types is ultimately obtained.

12 Claims, 2 Drawing Sheets

CLUSTERING METHOD AND SYSTEM FOR ROAD OBJECT ELEMENTS OF CROWDSOURCED MAP, AND STORAGE MEDIUM

CROSS REFERENCE TO RELATED APPLICATIONS

This application claims priority to Chinese Patent Application No. 202310179510.9, filed Feb. 28, 2023, the contents of which are incorporated by reference herein in their entirety.

FIELD OF THE INVENTION

The present disclosure belongs to the technical field of high-precision maps, and specifically relates to a clustering method and system for road object elements of a crowdsourced map, and a storage medium.

BACKGROUND OF THE INVENTION

In the development process of autonomous driving technology, high-precision maps are required for positioning and planning. The high-precision maps provide more accurate navigation information at road and lane levels than conventional maps, and can better serve autonomous vehicles. A method based on a crowdsourced map to collect a mass of latest data about crowdsourced roads is the best way to keep autonomous driving and the real world consistent.

The mapping of a high-precision map mainly includes two aspects: vehicle data collection and cloud data mapping. A cloud mapping system mainly uses data returned by a plurality of sensors mounted on a vehicle as a crowdsourced source, and achieves real-time incremental changes of a map by map learning. Clustering is a link of map learning in the production of the high-precision map. Its main purpose is to cluster a plurality of object data of the same type, which provides effective output for subsequent steps of map learning and can ensure that incremental map data of a crowdsourced map and map data of a map supplier can be updated periodically and interactively.

There are many common clustering algorithms, each of which has some advantages and disadvantages. For a K-means algorithm, it is difficult to select a K-value and difficult to converge a non-convex data set. If the data of each hidden category are imbalanced, for example, the data volume of each hidden category is seriously imbalanced, or the variance of each hidden category is different, the clustering effect is poor. The K-means algorithm is easily trapped into local optimization and is very sensitive to noise and abnormal points.

For a spectral clustering algorithm, the selection of different similarity matrix construction methods has a significant impact on results, and the algorithm is also sensitive to the selection of parameters, still requires clustering based on K-means after similarity matrices are constructed, and still has the above problems. In addition, when the data volume is large, the construction of the similarity matrices is time-consuming, and the computing power of the algorithm is weak. For a DBSCAN clustering algorithm, if the density of a sample set is uneven and the difference in cluster spacing is significant, the clustering quality is poor. If the sample set is large, the clustering convergence time is long. Conventional mean shift clustering algorithms use only distance for clustering determination, and cannot comprehensively consider actual complex road environments. In addition, their clustering effects are poor for some sparse and dense data that are not significantly distinguished.

At present, the mean shift clustering algorithms are mostly applied to image data. For example, patent document CN104751185B discloses an SAR image change detection method based on mean shift genetic clustering, including the following implementation steps: (1) import of images; (2) construction of a differential image; (3) mean shift filtering; (4) genetic fuzzy clustering; (5) segmentation of the differential image; and (6) output of results. For example, patent document CN105718942B discloses a hyperspectral image imbalance classification method based on mean drift and over-sampling, including first representing each pixel point of a hyperspectral image with a feature vector, and extracting a first principal component hyperspectral image using a principal component analysis dimensionality reduction method; obtaining a segmented image using a mean shift algorithm, and summing and averaging spectral values of the pixels in segmented blocks to obtain local spatial information; randomly selecting each category of samples from original hyperspectral image data, performing over-sampling pre-processing on the categories with fewer samples using an SMOTE technology, and then training a support vector machine for each category of samples in pairs; over-sampling support vectors trained by a few categories and multiple categories on a classification hyperplane again; classifying, in combination with empty spectral information, test samples with a mixed kernel support vector machine classifier to obtain a classified map; and fusing the segmented image and the classified map to obtain final classification results. For another example, patent document CN111695389A discloses a lane line clustering method and apparatus, where the method includes: obtaining a lane line feature image, and forming a set of feature points from pixel points in the lane line feature image according to a preset rule; selecting feature point groups from the set of feature points in sequence according to preset conditions, and horizontally clustering the feature point groups to generate each cluster group; computing a cluster center of each cluster group; and updating lane lines in an existing set of lane lines according to preset lane line retention conditions and a relationship between each cluster center and the existing set of lane lines, and returning to the step of horizontally clustering the feature point groups in the set of feature points according to the preset conditions to generate each cluster group, until the set of feature points is traversed, thus obtaining clustering results of the lane line feature image. Although the above methods cluster lane lines, their central idea is to obtain a lane line feature image and perform clustering from visual features of the image, which requires to pre-set rules and is not applicable to all types of road elements. Therefore, for a mass of crowdsourced road object data of different types, an urgent problem to be solved currently is to find a clustering algorithm that accurately and quickly achieves better clustering results, in response to the shortcomings of common clustering algorithms.

Therefore, it is necessary to develop a clustering method for road object elements of a crowdsourced map, a storage medium, a device, and a vehicle.

SUMMARY OF THE INVENTION

The present disclosure aims to provide a clustering method and system for road object elements of a crowd-sourced map, and a storage medium, which improve algorithmic efficiency, have a small computation quantity, are unaffected by abnormal points, and can be applied to clustering of multiple data distribution types.

In a first aspect, a clustering method for road object elements of a crowdsourced map described in the present disclosure includes the following steps:

S1: obtaining road object data of the crowdsourced map, classifying road object elements, randomly selecting a type of road object data, computing centroid coordinates of road objects, and putting the centroid coordinates of the road objects in a same category into a list type_dblist;

S2: defining parameters: setting a bandwidth distance band_width, a threshold Inter0 of a ratio of an intersection area to a minimum area, a threshold epsilon of a distance between two centroid coordinates, and a threshold min_max0 of a ratio of the minimum area to a maximum area between an initial cluster center and a cluster sample point, as well as an initial value of cluster_id, where cluster_id is a cluster category label;

S3: when the list type_dblist is not empty, randomly selecting a point from the list type_dblist as the initial cluster center, and if the cluster center is an invalid value, ending the current loop and selecting a new point; otherwise, putting the centroid coordinates of the cluster center into a list sample_count1, and putting original data of the cluster center into a list sample_count2;

S4: drawing a circle with the cluster center as a center and the bandwidth distance band_width as a radius; circularly computing a centroid distance dis_e, a ratio Inter of an intersection area to a minimum area, and a ratio min_max of the minimum area to a maximum area between each point within the circle and the cluster center; putting the centroid coordinates of the points within the circle that simultaneously satisfy dis_e<epsilon, Inter<Inter0, and min_max<min_max0 and their original data into the list sample_count1 and the list sample_count2 respectively; after the points within the circle are looped through, if a length of the list sample_count1 is greater than a preset length, computing a mean offset value according to the points in the list sample_count1 to obtain a new cluster center; if the distance between the current cluster center and the new cluster center is ≥epsilon, performing step S5; otherwise, repeating step S4 with the new cluster center as a center;

S5: determining the length of the list sample_count1; if the length of the list sample_count1 is >the preset length, saving the clustering results, putting the clustering results stored in the list sample_count1 and the list sample_count2 in correspondingly into a list groups1 and a list groups2, then determining that all samples belonging to the same first cluster have been found, and increasing the cluster_id by 1; if the length of the list sample_count1 is ≤the preset length, determining that there are abnormal points, and skipping storing the clustering results into the list groups1 and the list groups2; finally, solving a difference between the list type_dblist and the list sample_count1, using the result of the difference as a new list type_dblist, cycling steps S3-S5 until all samples of the same type are clustered, and performing step S6;

S6: looping through the list groups1 to obtain centroid coordinates of the first cluster in the groups1, and computing a Euclidean distance between the centroid coordinates of the first cluster and the centroid coordinates of any other cluster; if the distance is less than the bandwidth distance band_width, merging the two clusters into a same cluster, and selecting the cluster_id of the longer cluster as a new cluster_id, where the clusters that have been merged will not undergo the next merged cluster determination until all clusters in the list groups1 are determined; and S7: repeating steps S1-S6 until all types of samples are clustered. At this point, all the clustering results of the current road object elements have been output, and then different types of outermost loops are performed.

Optionally, in step S1, the obtaining road object data of the crowdsourced map and classifying road object elements specifically includes:

S11: collecting road element object data of the crowdsourced map, and cleaning and calibrating the data to obtain the road object elements; and S12: classifying the road object elements according to preset object element classification rules to obtain different types of road object data.

Optionally, in step S4, the centroid distance dis_e is computed as follows:

assuming that the current centroid coordinate point is $X(x, x_2, \ldots, x_i, \ldots, x_d)$ in a d-dimensional space, and a sample point in a to-be-clustered list is $Y=[Y_1, Y_2, \ldots, Y_j, \ldots, Y_n]$, where n is the number of samples, $Y_j(y, y_2, \ldots, y_i \ldots, y_d)$;

a computational formula for the centroid distance is as follows:

$$dis(X, Y_j) = \sqrt{\sum_{i=1}^{d}(x_i - y_i)^2}, \ (j = 1, 2, \ldots, n);$$

where $dis(X, Y_j)$ represents the centroid distance.

Optionally, in step S4, the ratio Inter of the intersection area to the minimum area is computed as follows:

assuming that the area of an initial cluster center object is area1, the area of a to-be-clustered sample object is area2, and the intersection area of the two objects is intersection_area;

the ratio Inter of the intersection area to the minimum area of the two objects is:

$$Inter = intersection\_area/min(area1, area2).$$

Optionally, in step S4, the ratio min_max of the minimum area to the maximum area is computed as follows:

assuming that the area of an initial cluster center object is area1, the area of a to-be-clustered sample object is area2, and the intersection area of the two objects is intersection_area;

the ratio min_max of the minimum area to the maximum area of the two objects is:

$$min\_max = min(area1, area2)/max(area1, area2).$$

Optionally, in step S4, the new cluster center is computed as follows:

$$denominator = \sum_{j=1}^{n} \frac{1}{\sqrt{2\pi} * band\_width} e^{\frac{-dis(X,Y_j)^2}{2*band\_width^2}}$$

-continued $$numerator = \sum_{j=1}^{n} \left( \left( \frac{1}{\sqrt{2\pi} * band\_width} e^{\frac{-dis(X,Y_j)^2}{2*band\_width^2}} \right) * Y_j \right)$$

$$new\_center = numerator/denominator$$

where denominator is a fractional denominator, numerator is a fractional numerator, and new_center is a new cluster center.

Optionally, in step S6, assuming that the list groups1 includes clusters $[C_1, C_2, \ldots . C_k, \ldots , C_m]$, where $C_k$ stores centroid coordinates $[c_{k1}, c_{k2}, \ldots , c_{kt}, \ldots , c_{kp}]$ of all sample points belonging to the cluster $C_k$, a formula for computing mean centroid coordinates of all the sample points in the cluster $C_k$ is as follows:

$$C = \sum_{t=1}^{P} c_{kt}$$

$$C_{d\_mean} = \left( \sum_{t=1}^{P} c_{kt} \right)/p$$

where $C_{d\_mean}$ is the mean centroid coordinates of all the sample points in the cluster $C_k$; and C is a sum of the centroid coordinates of all the sample points in the cluster $C_k$.

Optionally, if d=2, the mean centroid coordinates of the cluster $C_k$ are $(x_{1\_mean}, x_{2\_mean})$; if d=3, the mean centroid coordinates of the cluster $C_k$ are $(x_{1\_mean}, x_{2\_mean}, x_{3\_mean})$, and so on, where d is a dimension.

Optionally, the classifying road object elements specifically include:

classifying the road objects according to types and subtypes of the objects.

Optionally, the types include at least one of arrows, vehicle lines, ground signs, and boundaries;

the subtypes of the arrows include at least one of right turn, straight+left turn, straight+right turn, left turn+right turn, left front, right front, straight+u-turn, left turn+u-turn, left u-turn, right u-turn, no left turn, no right turn, no u-turn, no left turn and no right turn, no left turn and no u-turn, no right turn and no u-turn, left turn+straight+right turn, and left turn+right turn+u-turn;

the subtypes of the vehicle lines include at least one of virtual lines, thin dotted segments, thick dotted segments, single dotted lines, single solid lines, double dotted lines, double solid lines, left solid and right dotted lines, right solid and left dotted lines, laid edge lines, stop lines, zebra crossings, speed bumps, stop yield lines, diversion lines, and parking lot markings;

the subtypes of the ground signs include at least one of text and ground speed limits; and the subtypes of the boundaries include at least one of guardrails, curbs, fences, geographical boundaries, and walls.

In a second aspect, a clustering system for road object elements of a crowdsourced map described in the present disclosure includes a processor and a memory, where the memory stores a computer-readable program, and when the computer-readable program is called by the processor, the steps of the clustering method for road object elements of a crowdsourced map as described in the present disclosure can be performed.

In a third aspect, a storage medium described in the present disclosure stores a computer-readable program, and when the computer-readable program is called, the steps of the clustering method for road object elements of a crowdsourced map as described in the present disclosure can be performed.

The present disclosure has the following advantages:

a. Since a polygonal type of data is used in the present disclosure, the complex polygonal type is transformed into centroids for expression to facilitate subsequent clustering.

b. Conventional mean shift algorithms generally use distances for determination. On this basis, the present disclosure transforms polygonal objects into centroids as a breakthrough point, and comprehensively considers multiple geometric relationships such as a distance between centroids, a ratio of intersection area to minimum area objects, and a ratio of minimum area to maximum area to cluster object data.

c. The improved mean shift algorithm of the present disclosure can well solve the impact of abnormal points and minimal clusters, is insensitive to data types and distribution, has a high clustering speed, and can be well applied to complex road object element data.

d. The present disclosure further focuses on the particularity of road object element data, and makes determinations in the clustering process, which not only considers the relationships between objects, but also expands the scope of clustering objects, and comprehensively considers the relationships between objects and neighborhood objects thereof.

In summary, the present disclosure has the advantages of high efficiency and small computation quantity, is unaffected by abnormal points, and can be applied to clustering of multiple data distribution types.

BRIEF DESCRIPTION OF THE DRAWINGS

In order to illustrate the technical solutions of the embodiments of the present disclosure more clearly, the accompanying drawings required for use in the embodiments will be introduce briefly below. It should be understood that the following drawings show only some embodiments of the present disclosure and should not be regarded as limiting the scope, and other relevant drawings can be derived based on the accompanying drawings by those of ordinary skill in the art without any creative efforts.

DETAILED DESCRIPTION OF THE EMBODIMENTS

The present disclosure will be explained in detail below with reference to the accompanying drawings.

Figure 1:
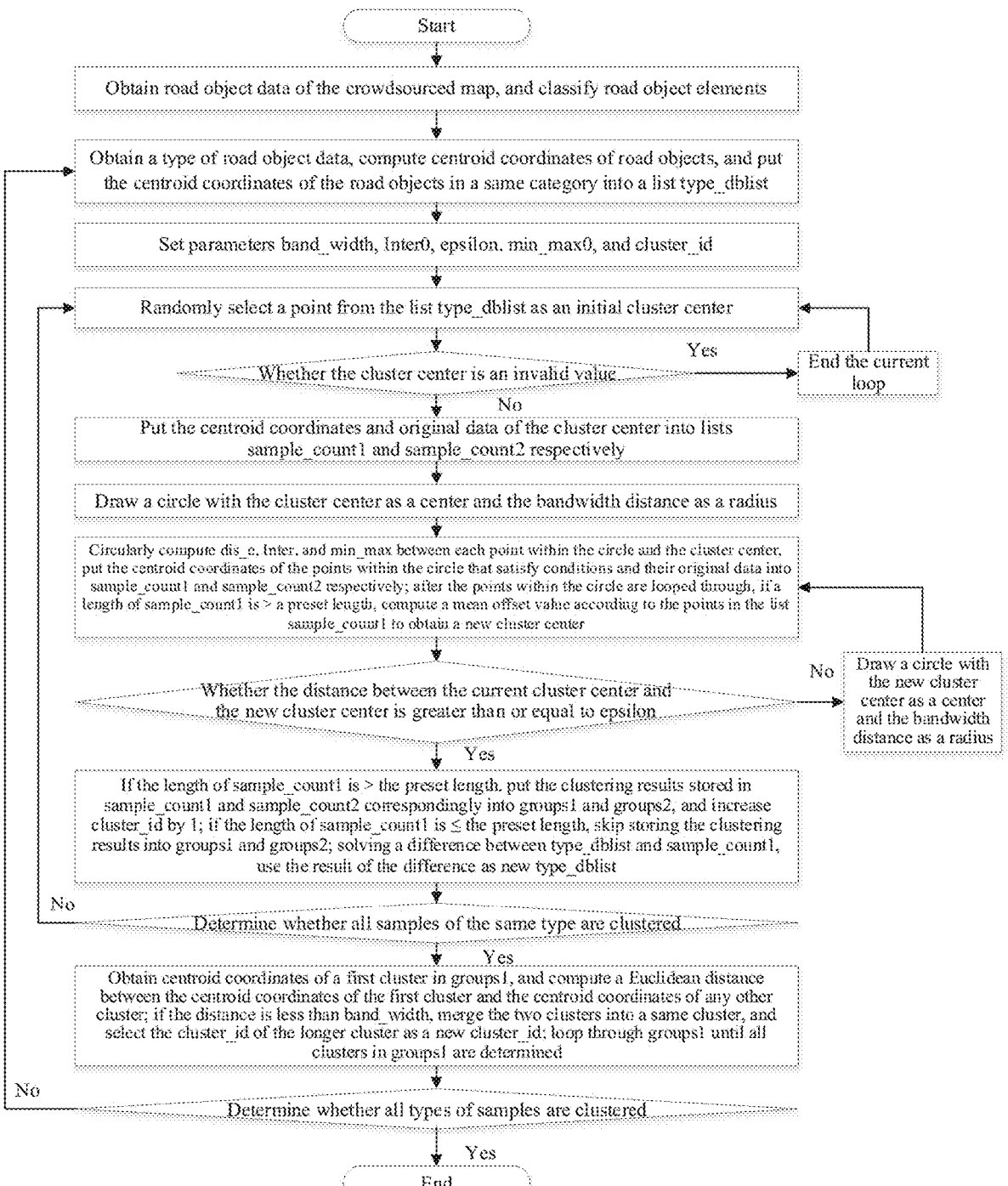
FIG. 1 is a flowchart of an embodiment.

As shown in FIG. 1, in this embodiment, a clustering method for road object elements of a crowdsourced map includes the following steps:

At S1: road object data of the crowdsourced map are obtained, road object elements are classified, a type of road object data are randomly selected, centroid coordinates of road objects are computed, and the centroid coordinates of the road objects in a same category are put into a list type_dblist.

In step S1, the process that road object data of the crowdsourced map are obtained and road object elements are classified specifically includes:

At S11: road element object data of the crowdsourced map are collected, and the data are cleaned and calibrated to obtain the road object elements;

At S12: the road object elements are classified to obtain different types of road object data.

In step S12, the road object elements are classified according to types and subtypes of objects.

The types include at least one of arrows, vehicle lines, ground signs, and boundaries. The subtypes of the arrows include at least one of right turn, straight+left turn, straight+right turn, left turn+right turn, left front, right front, straight+u-turn, left turn+u-turn, left u-turn, right u-turn, no left turn, no right turn, no u-turn, no left turn and no right turn, no left turn and no u-turn, no right turn and no u-turn, left turn+straight+right turn, and left turn+right turn+u-turn. The subtypes of the vehicle lines include at least one of virtual lines, thin dotted segments, thick dotted segments, single dotted lines, single solid lines, double dotted lines, double solid lines, left solid and right dotted lines, right solid and left dotted lines, laid edge lines, stop lines, zebra crossings, speed bumps, stop yield lines, diversion lines, and parking lot markings. The subtypes of the ground signs include at least one of text and ground speed limits. The subtypes of the boundaries include at least one of guardrails, curbs, fences, geographical boundaries, and walls.

At S2: parameters are defined: a bandwidth distance band_width, a threshold Inter0 of a ratio of an intersection area to a minimum area, a threshold epsilon of a distance between two centroid coordinates, and a threshold min_max0 of a ratio of the minimum area to a maximum area between an initial cluster center and a cluster sample point, as well as an initial value of a cluster category label cluster_id are set. The initial value of cluster_id is usually set to 0.

At S3: when the list type_dblist is not empty, a point is randomly selected from the list type_dblist as the initial cluster center, and if the cluster center is an invalid value, the current loop is ended and a new point is selected; otherwise, the centroid coordinates of the cluster center are put into a list sample_count1, and original data of the cluster center are put into a list sample_count2.

At S4: a circle is drawn with the cluster center as a center and the bandwidth distance band_width as a radius; a centroid distance dis_e, a ratio Inter of an intersection area to a minimum area, and a ratio min_max of the minimum area to a maximum area between each point within the circle and the cluster center are circularly computed; the centroid coordinates of the points within the circle that simultaneously satisfy dis_e<epsilon, Inter<Inter0, and min_max<min_max0 and their original data are put into the list sample_count1 and the list sample_count2 respectively; after the points within the circle are looped through, if a length of the list sample_count1 is greater than a preset length, a mean offset value is computed according to the points in the list sample_count1 to obtain a new cluster center; if the distance between the current cluster center and the new cluster center is ≥epsilon, step S5 is performed; otherwise, step S4 is repeated with the new cluster center as a center.

In step S4, the centroid distance dis_e is computed as follows:

It is assumed that the current centroid coordinate point is $X(x, x_2, \ldots, x_i, \ldots, x_d)$ in a d-dimensional space, i=1, 2, . . . , d, and a sample point in a to-be-clustered list is $Y=[Y_1, Y_2, \ldots, Y_j, \ldots, Y_n]$, j=1, 2, . . . , n, where n is the number of samples, $Y_j(y, y_2, \ldots, y_i \ldots, y_d)$;

A computational formula for the centroid distance is as follows:

$$dis(X, Y_j) = \sqrt{\sum_{i=1}^{d}(x_i - y_i)^2}, \ (j = 1, 2, \ldots, n);$$

Here, $dis(X, Y_j)$ represents the centroid distance.

In step S4, the ratio Inter of the intersection area to the minimum area is computed as follows:

It is assumed that the area of an initial cluster center object is area1, the area of a to-be-clustered sample object is area2, and the intersection area of the two objects is intersection_area;

The ratio Inter of the intersection area to the minimum area of the two objects is:

$$Inter = \text{intersection\_area/min(area1, area2)}.$$

In step S4, the ratio min_max of the minimum area to the maximum area is computed as follows:

It is assumed that the area of an initial cluster center object is area1, the area of a to-be-clustered sample object is area2, and the intersection area of the two objects is intersection_area;

The ratio min_max of the minimum area to the maximum area of the two objects is:

$$\text{min\_max} = \text{min(area1, area2)/max(area1, area2)}.$$

In step S4, the new cluster center is computed as follows:

In order to transform low-dimensional non-separable data into high-dimensional separable data, a Gaussian kernel function is used in this embodiment to map the former to a high-dimensional space, and a new cluster center point is computed by a mean shift formula, specifically:

$$\text{denominator} = \sum_{j=1}^{n} \frac{1}{\sqrt{2\pi} * \text{band\_width}} e^{\frac{-dis(X, Y_j)^2}{2 * \text{band\_width}^2}}$$

$$\text{numerator} = \sum_{j=1}^{n} \left( \left( \frac{1}{\sqrt{2\pi} * \text{band\_width}} e^{\frac{-dis(X, Y_j)^2}{2 * \text{band\_width}^2}} \right) * Y_j \right)$$

$$\text{new\_center} = \text{numerator/denominator}$$

Here, denominator is a fractional denominator, numerator is a fractional numerator, and new_center is a new cluster center.

At S5: In order to eliminate the impact of abnormal points and randomly selected initial points on clustering effects, this embodiment adds the determination of the number of samples within a cluster; if the length of the list sample_count1 is >the preset length, the clustering results are saved, the clustering results stored in the list sample_count1 and the list sample_count2 are correspondingly put into a list groups1 and a list groups2, it is then considered that all samples belonging to the same first cluster have been found, and the cluster_id is increased by 1; if the length of the list sample_count1 is ≤the preset length, it is considered that there are abnormal points, the clustering results are discarded and will not be stored into the list groups1 and the list groups2; finally, a difference between the list type_dblist and the list sample_count1 is solved, the result of the difference is used as a new list type_dblist, steps S3-S5 are cycled until all samples of the same type are clustered, and step S6 is performed.

In this embodiment, the preset length is generally set to 3, with at least 3 samples clustered. The value of the preset length may be adjusted according to actual requirements.

At S6: the list groups 1 is looped through to obtain centroid coordinates of the first cluster in the groups1, and a Euclidean distance between the centroid coordinates of the first cluster and the centroid coordinates of any other cluster is computed; if the distance is less than the bandwidth distance band_width, the two clusters are merged into a same cluster, and the cluster_id of the longer cluster is selected as a new cluster_id; the clusters that have been merged will not undergo the next merged cluster determination until all clusters in the list groups1 are determined.

In step S6, it is assumed that the list groups1 includes clusters $[C_1, C_2, \ldots, C_k, \ldots, C_m]$, where $C_k$ stores centroid coordinates $[c_{k1}, c_{k2} > \ldots, c_{kt}, \ldots, c_{kp}]$ of all sample points belonging to the cluster $C_k$, a formula for computing mean centroid coordinates of all the sample points in the cluster $C_k$ is as follows:

$$C = \sum_{t=1}^{P} c_{kt}$$

$$C_{d\_mean} = \left(\sum_{t=1}^{P} c_{kt}\right)/p$$

Here, $C_{d\_mean}$ is the mean centroid coordinates of all the sample points in the cluster $C_k$; and C is a sum of the centroid coordinates of all the sample points in the cluster $C_k$.

If d=2, the mean centroid coordinates of the cluster $C_k$ are $(x_{1\_mean}, x_{2\_mean})$; if d=3, the mean centroid coordinates of the cluster $C_k$ are $(x_{1\_mean}, x_{2\_mean}, x_{3\_mean})$, and so on, where d is a dimension.

S7: At this point, all the clustering results of the current road object elements have been output, and then different types of outermost loops are performed, that is, steps S1-S6 are repeated until all types of samples are clustered.

The method used for road object elements of a crowdsourced map is efficient and can well solve the impact of abnormal points and minimal clusters by skillfully transforming the road object elements into centroid representations and flexibly combining multiple geometric relationships of their objects into new distance weights, and can be well applied to complex road object element data by flexibly selecting the distance weights.

In this embodiment, each road element is composed of a plurality of polygonal objects, and a main data label of a single polygonal object is constituted by type+subtype+ geometric longitude and latitude coordinates;

Discrimination factors for the geometric relationships between the road objects in this embodiment include a centroid distance, a ratio Inter of an intersection area to a minimum area, and a ratio min_max of the minimum area to a maximum area of objects.

Figure 2:
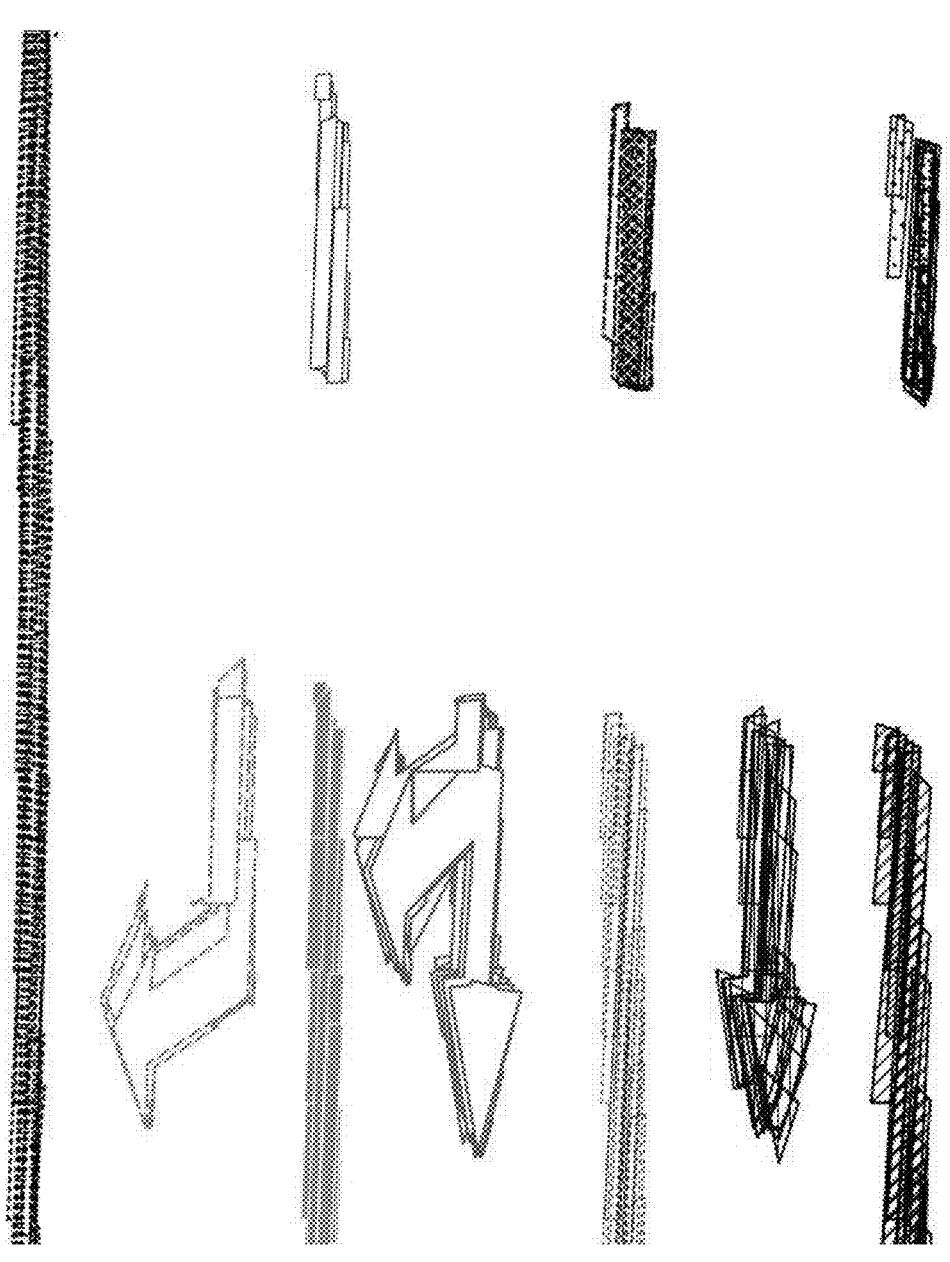
FIG. 2 is a clustering effect diagram of different types of road object elements in an embodiment.

FIG. 2 is an effect diagram of the clustering method for road object elements of a crowdsourced map. Two types of road object elements, namely, arrows and vehicle lines, are used as an example. Good clustering results can be output after clustering using the method.

A clustering method for road object elements of a crowdsourced map is provided for the particularity of road element data and the shortcomings of existing clustering algorithms. The method skillfully represents polygon type data of road objects with their centroids according to an improved mean shift algorithm, and selects, according to different types of road objects, geometric relationships between different objects as measurement conditions for clustering. Neighborhood relationships of the objects are further considered in the clustering process according to the characteristics of road element data types, and clustering output of different road element types is ultimately obtained. The method skillfully transforms object data into their centroids as clustering input, and flexibly uses multiple geometric relationships of the objects according to different scenarios, so the method has the advantages of conventional mean shift algorithms, such as high efficiency, small computation quantity, and insusceptibility to abnormal points. The method further incorporates the neighborhood relationships of the objects to solve the shortcoming that the conventional mean shift algorithms are not suitable for complex data distribution types.

In an embodiment, a clustering system for road object elements of a crowdsourced map includes a processor and a memory, where the memory stores a computer-readable program, and when the computer-readable program is called by the processor, the steps of the clustering method for road object elements of a crowdsourced map in the foregoing embodiments can be performed.

In an embodiment, a storage medium stores a computer-readable program, and when the computer-readable program is called, the steps of the clustering method for road object elements of a crowdsourced map in the foregoing embodiments can be performed.

It should be noted that the storage medium shown in this embodiment may be a computer-readable signal medium, a computer-readable storage medium, or any combination of the above two. For example, the computer-readable storage medium may be, an electrical, magnetic, optical, electromagnetic, infrared, or semiconductor system, apparatus, or device, or any combination of the above. More specific examples of the computer-readable storage medium may include, but are not limited to: an electrical connection with one or more wires, a portable computer disk, a hard disk, a random access memory (RAM), a read-only memory (ROM), an erasable programmable read only memory (EPROM), a flash, an optical fiber, a portable compact disk read-only memory (CD-ROM), an optical storage device, a magnetic storage device, or any suitable combination of the above. In this embodiment, the computer-readable signal medium may include data signals in a base band or propagated as some of carriers, in which the computer-readable program is carried. The propagated data signals may be in various forms, including but not limited to electromagnetic signals, optical signals, or any suitable combination of the above. The computer-readable signal medium may alternatively be any other computer-readable medium other than the computer-readable storage medium. The computer-readable medium is capable of sending, propagating or transmitting a program used by an instruction execution system, apparatus or device or a combination thereof. The computer program included in the computer-readable medium may be transmitted by any suitable medium, including but not limited to wireless, wired, or any suitable combination of the above.

The foregoing embodiments are preferred implementations of the present disclosure, but the implementations of the present disclosures are not limited by the foregoing embodiments. Any other changes, modifications, substitutions, combinations, or simplifications made without departing from the spirit essence and principle of the present disclosure shall be equivalent replacements, and shall fall within the protection scope of the present disclosure.

The invention claimed is:

1. A clustering method for road object elements of a crowdsourced map, the method being executed by a processor for mapping a high-precision map to assist in positioning and planning of an autonomous vehicle and comprising the following steps:

S1: obtaining road object data of the crowdsourced map, classifying road object elements, randomly selecting a type of road object data, computing centroid coordinates of road objects, and putting the centroid coordinates of the road objects in a same category into a list type_dblist;

S2: setting a bandwidth distance band_width, a threshold Inter0 of a ratio of an intersection area to a minimum area, a threshold epsilon of a distance between two centroid coordinates, and a threshold min_max0 of a ratio of the minimum area to a maximum area between an initial cluster center and a cluster sample point, as well as an initial value of a cluster category label cluster_id;

S3: when the list type_dblist is not empty, randomly selecting a point from the list type_dblist as the initial cluster center, and if the cluster center is an invalid value, ending the current loop and selecting a new point; otherwise, putting the centroid coordinates and original data of the cluster center into a list sample_count1 and a list sample_count2 respectively;

S4: drawing a circle with the cluster center as a center and the bandwidth distance band_width as a radius; circularly computing a centroid distance dis_e, a ratio Inter of an intersection area to a minimum area, and a ratio min_max of the minimum area to a maximum area between each point within the circle and the cluster center; putting the centroid coordinates of the points within the circle that simultaneously satisfy dis_e<epsilon, Inter<Inter0, and min_max<min_max0 and their original data into the list sample_count1 and the list sample_count2 respectively; after the points within the circle are looped through, if a length of the list sample_count1 is greater than a preset length, computing a mean offset value according to the points in the list sample_count1 to obtain a new cluster center; if the distance between the current cluster center and the new cluster center is ≥epsilon, performing step S5; otherwise, repeating step S4 with the new cluster center as a center;

S5: if the length of the list sample_count1 is >the preset length, putting the clustering results stored in the list sample_count1 and the list sample_count2 correspondingly into a list groups1 and a list groups2, and increasing the cluster_id by 1;

if the length of the list sample_count1 is ≤the preset length, skipping storing the clustering results into the list groups1 and the list groups2; solving a difference between the list type_dblist and the list sample_count1, using the result of the difference as a new list type_dblist, cycling steps S3-S5 until all samples of the same type are clustered;

S6: obtaining centroid coordinates of a first cluster in the groups1, and computing a Euclidean distance between the centroid coordinates of the first cluster and the centroid coordinates of any other cluster; if the distance is less than the bandwidth distance band_width, merging the two clusters into a same cluster, and selecting the cluster_id of the longer cluster as a new cluster_id; looping through the list groups1 until all clusters in the list groups1 are determined; and S7: cycling steps S1-S6 until all types of samples are clustered.

2. The clustering method for road object elements of a crowdsourced map according to claim 1, wherein in step S1, the obtaining road object data of the crowdsourced map and classifying road object elements specifically comprises:

S11: collecting road element object data of the crowdsourced map, and cleaning and calibrating the data to obtain the road object elements; and S12: classifying the road object elements according to preset object element classification rules to obtain different types of road object data.

3. The clustering method for road object elements of a crowdsourced map according to claim 1, wherein in step S4, the centroid distance dis_e is computed as follows:

assuming that the current centroid coordinate point is X $(x, x_2, \ldots, x_i, \ldots x_d)$ in a d-dimensional space, i=1, 2, . . . , d, and a sample point in a to-be-clustered list is $Y=[Y_1, Y_2, \ldots, Y_j \ldots, Y_n]$, j=1, 2, . . . , n, wherein n is the number of samples, $Y_j(y, y_2 \ldots, y_i \ldots, y_d)$; a computational formula for the centroid distance is as follows:

$$dis(X, Y_j) = \sqrt{\sum_{i=1}^{d} (x_i - y_i)^2} \, ;$$

wherein $dis(X, Y_j)$ represents the centroid distance.

4. The clustering method for road object elements of a crowdsourced map according to claim 1, wherein in step S4, the ratio Inter of the intersection area to the minimum area is computed as follows:

assuming that the area of an initial cluster center object is area1, the area of a to-be-clustered sample object is area2, and the intersection area of the two objects is intersection_area;

the ratio Inter of the intersection area to the minimum area of the two objects is:

Inter=intersection_area/min (area1, area2).

5. The clustering method for road object elements of a crowdsourced map according to claim 1, wherein in step S4, the ratio min_max of the minimum area to the maximum area is computed as follows:

assuming that the area of an initial cluster center object is area1, the area of a to-be-clustered sample object is area2, and the intersection area of the two objects is intersection_area;

the ratio min_max of the minimum area to the maximum area of the two objects is:

min_max=min (area1, area2)/max (area1, area2).

6. The clustering method for road object elements of a crowdsourced map according to claim 3, wherein in step S4, the new cluster center is computed as follows:

$$denominator = \sum_{j=1}^{n} \frac{1}{\sqrt{2\pi} * band\_width} e^{\frac{-dis(X,Y_j)^2}{2*band\_width^2}}$$

-continued $$\text{numerator} = \sum_{j=1}^{n} \left( \left( \frac{1}{\sqrt{2\pi} * \text{band\_width}} e^{\frac{-dis(X,Y_j)^2}{2*band\_width^2}} \right) * Y_j \right)$$

new_center-numerator/denominator wherein denominator is a fractional denominator, numerator is a fractional numerator, and new_center is a new cluster center.

7. The clustering method for road object elements of a crowdsourced map according to claim 1, wherein in step S6, assuming that the list groups1 comprises clusters $[C_1, C_2, \ldots, C_k, \ldots, C_m]$, wherein $C_k$ stores centroid coordinates $[c_{k1}, c_{k2}, \ldots, c_{kt}, \ldots, c_{kp}]$ of all sample points belonging to the cluster $C_k$, a formula for computing mean centroid coordinates of all the sample points in the cluster $C_k$ is as follows:

$$C = \sum_{t=1}^{P} c_{kt}$$

$$C_{d\_mean} = \left( \sum_{t=1}^{P} c_{kt} \right) / p$$

wherein $C_{d\_mean}$ mean is the mean centroid coordinates of all the sample points in the cluster $C_k$; and C is a sum of the centroid coordinates of all the sample points in the cluster $C_k$.

8. The clustering method for road object elements of a crowdsourced map according to claim 7, wherein if d=2, the mean centroid coordinates of the cluster $C_k$ are $(x_{1\_mean}, x_{2\_mean})$; if d=3, the mean centroid coordinates of the cluster $C_k$ are $(x_{1\_mean}, x_{2\_mean}, x_{3\_mean})$, and so on, wherein d is a dimension.

9. The clustering method for road object elements of a crowdsourced map according to claim 2, wherein the classifying road object elements specifically comprises:

classifying the road object elements according to types and subtypes of the objects.

10. The clustering method for road object elements of a crowdsourced map according to claim 9, wherein the types comprise at least one of arrows, vehicle lines, ground signs, and boundaries, wherein the subtypes of the arrows comprise at least one of right turn, straight+left turn, straight+right turn, left turn+right turn, left front, right front, straight+u-turn, left turn+u-turn, left u-turn, right u-turn, no left turn, no right turn, no u-turn, no left turn and no right turn, no left turn and no u-turn, no right turn and no u-turn, left turn+straight+right turn, and left turn+right turn+u-turn;

the subtypes of the vehicle lines comprise at least one of virtual lines, thin dotted segments, thick dotted segments, single dotted lines, single solid lines, double dotted lines, double solid lines, left solid and right dotted lines, right solid and left dotted lines, laid edge lines, stop lines, zebra crossings, speed bumps, stop yield lines, diversion lines, and parking lot markings;

the subtypes of the ground signs comprise at least one of text and ground speed limits; and the subtypes of the boundaries comprise at least one of guardrails, curbs, fences, geographical boundaries, and walls.

11. A clustering system for road object elements of a crowdsourced map, comprising a processor and a memory, wherein the memory stores a computer-readable program, and when the computer-readable program is called by the processor, the steps of the clustering method for road object elements of a crowdsourced map according to claim 1 can be performed.

12. A non-transitory storage medium, storing a computer-readable program, wherein when the computer-readable program is called, the steps of the clustering method for road object elements of a crowdsourced map according to claim 1 can be performed.

\* \* \* \* \*